UNITED STATES PATENT OFFICE.

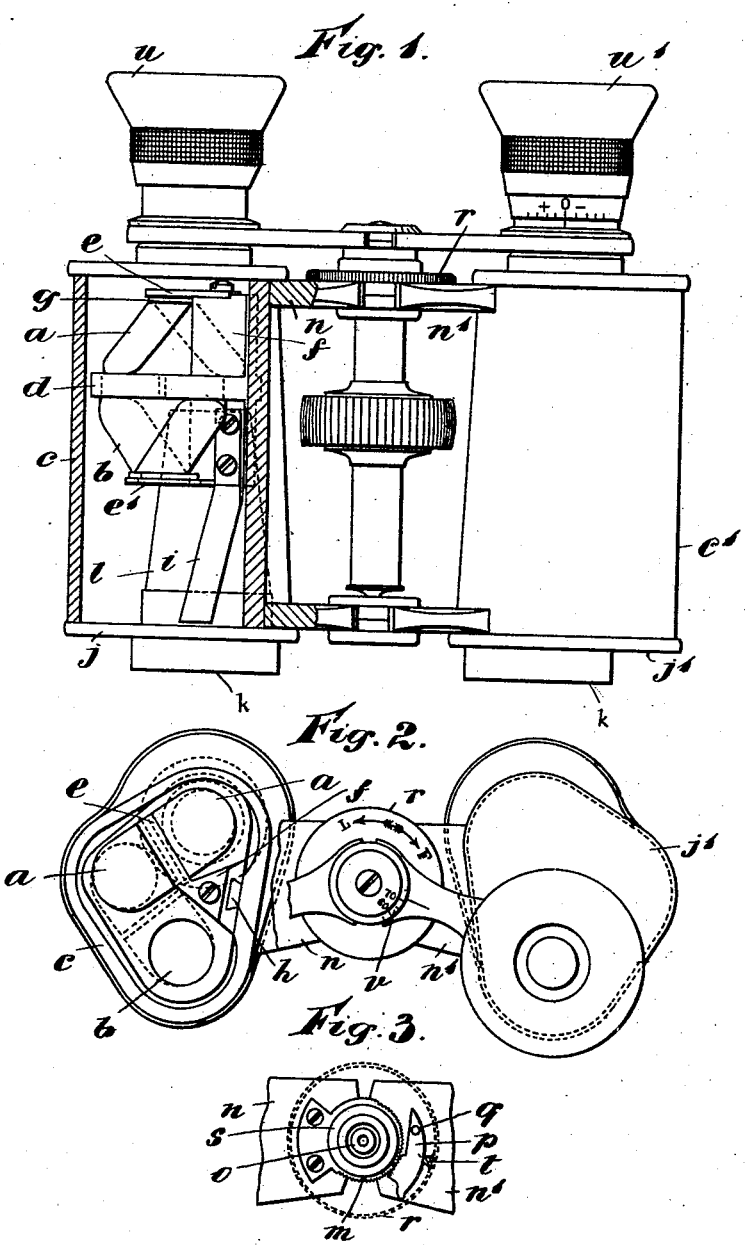

GEORGE WILSON HEATH, OF CRAYFORD, ENGLAND.

PRISM MONOCULAR AND BINOCULAR GLASS.

No. 849,237.

Specification of Letters Patent.

Patented April 2, 1907.

Application filed November 21, 1905. Serial No. 288,444.

*To all whom it may concern:*

Be it known that I, GEORGE WILSON HEATH, a subject of the King of Great Britain, residing at Crayford, in the county of Kent, England, have invented new and useful Improvements in Prism Monocular and Binocular Glasses, of which the following is a specification.

In prism monocular and binocular glasses as heretofore constructed the prisms are liable to become deranged and rendered inoperative if the instrument receives a blow or shock, and in such cases the prisms can only be readjusted and placed in their true position again by specially-skilled persons. Furthermore, in the event of the said prisms being removed in order that they or the lenses may be dusted or cleaned they cannot be replaced in their correct relative positions by an ordinary person.

The principal object of the present invention is to overcome these difficulties, and for this purpose I mount the before-mentioned prisms firmly and securely in such a manner that they may be easily removed from the apparatus for cleaning or other purposes and as easily replaced therein in exactly the same position as before without any skilled adjustment whatsoever being necessary.

The object of another part of this invention is to provide means whereby when once a binocular instrument has been adjusted to suit the distance apart of the eyes of the user it may be instantly clamped and securely locked in that position by a simple and easily-operated device.

The before-mentioned improvements are illustrated in the accompanying sheet of drawings, in which—

Figure 1 is an elevation of a pair of prism binocular glasses, the left-hand tube or compartment being shown in section. Fig. 2 is a plan view of Fig. 1, but with all parts above the top of the left-hand tube removed; and Fig. 3 is a detail view.

Similar letters of reference relate to like parts in all the figures of the drawings.

$a$ and $b$ are two prisms arranged somewhat in the usual manner, but instead of being disposed separately and independently of one another in the tube $c$ of the apparatus, as heretofore, they are both mounted securely and rigidly in one framework, carriage, or cage, as shown, the base of the prism $a$ resting in a recess in one side of the central plate $d$ of the said carriage or cage, being steadied therein by the plate $e$, screwed to the post $f$ and bearing upon the apex of the prism, cork or other soft and yielding material $g$ being interposed between the prism and the plate $e$ in the usual manner. The base of the prism $b$ similarly rests in a recess in the reverse side of the central plate $d$ and is steadied therein by the plate $e'$, screwed to the post $f$. The back of the post $f$ is furnished with a dovetail groove which is adapted to slide with a good fit on a dovetail feather $h$, formed on or attached to the interior surface of the tube or compartment $c$. The carriage or cage $d f$ is provided with a handle-bar $i$, by which it may be readily withdrawn from or placed in position in the tube $c$, and by which it may be held by the fingers while the faces of the prisms $a$ $b$ are being dusted or cleaned. The end of the handle-bar $i$ also serves to prevent the carriage or cage $d f$ from moving endwise in the tube or compartment $c$ when the cover-plate $j$ is in position.

The before-mentioned dovetail feather $h$ or other equivalent means of attachment of the carriage or cage $d f$ to the tube or compartment $c$ is preferably provided at the side nearest to the center of the instrument in order to insure that the carriage or cage and its prisms shall not be affected by any blow or shock imparted to the outer sides of the tube or compartment $c$.

It will be seen that by mounting and securing the prisms in the above-described compact manner I am enabled to employ long light screen-cones, as shown at $l$ in Fig. 1, thereby increasing the efficiency of the instrument.

It will now be understood that when it is desired to remove the prisms $a$ $b$ from the instrument for dusting, cleaning, or otherwise the cover-plates $j$ $j'$ are first removed, together with the object-glasses $k$, and light screen-cones $l$ connected therewith. Either of the handle-bars $i$ may then be grasped by the finger and thumb and the carriage or cage $d f$ may be drawn out, the dovetail guide sliding on the feather $h$. On returning the carriage or cage $d f$ to its place in the instrument it is passed into the tube $c$ until its dovetail guide has engaged with the slide $h$, when it is pushed home and the cover-plate $j$ replaced and secured in position, when its internal surface will coincide more or less closely with the end of the handle-bar $i$, and thereby secure the prisms against any movement endwise of the tube $c$.

In order to clamp and securely lock a binocular instrument in any desired position according to the distance apart of the eyes of the user, I employ the following devices: $m$ is a sector screwed or otherwise attached to the lug $n$ of the tube $c$. This sector passes loosely over the hinge-pin $o$ and is furnished on part of its circumferential edge with serrations or teeth, as shown in Fig. 3. $p$ is a lever pivoted at $q$ on the corresponding lug $n'$ of the other tube $c'$ and furnished with serrations or teeth which are adapted to engage with the similar serrations or teeth of the sector $m$, as seen clearly in Fig. 3. $r$ is a disk with a milled outer edge, which disk is adapted to rotate on the boss $s$ and has a recess on its under side, in which recess the sector $m$ and lever $p$ are contained when the parts are in position. On the inner circumferential edge of the wall of the recess is formed a cam or projection $t$, as shown in Fig. 3. It will now be seen that when the disk $r$ is turned in the direction of the arrow L, Fig. 2, the cam or projection $t$ is clear of the lever $p$, and the relative positions of the tubes $c$ $c'$ and eyepieces $u$ $u'$ may be varied to the required extent and set to the desired position either by applying the instrument to the eyes or by means of the scale $v$, Fig. 2. When the eyepieces are in the desired position, the disk $r$ may be turned in the direction of the arrow F, Fig. 2, and the cam or projection $t$ will thereby be caused to slide along the back of the lever $p$ and cause the serrations or teeth of the latter to engage with the serrations or teeth on the sector $m$, and the parts will thereby be retained in the clamped or locked position until the recessed disk $r$ is rotated in the reverse direction, liberating the serrations or teeth of the lever $p$ from those of the sector $m$ and enabling the tubes $c$ $c'$ and eyepieces $u$ $u'$ to be again adjusted.

I claim—

1. In prism monocular and binocular glasses in combination, the tubes of the instrument, separate removable rigid carriages, prisms securely mounted in said carriages, said carriages having dovetail slide connections with the body of the instrument and handle-bars for manipulating the carriages and in combination with the cover-plates for preventing endwise movement thereof in the instrument, substantially as described.

2. In prism binocular glasses in combination, the tubes of the instrument, the prisms, separate rigid carriages carrying the prisms said carriages having dovetailed grooves therein and feathers formed on the internal sides of the tubes which are nearest to the center of the instrument engaging with said grooves.

3. In prism binocular glasses, in combination with the tubes of the instrument, and the lugs connecting the same together, the clamping and locking devices consisting of a serrated sector, a corresponding serrated lever and a rotatable disk carrying a projection adapted to engage when required with the serrated lever, substantially as described and for the purpose set forth.

In testimony whereof I have signed my name to this specification in the presence of two subscribing witnesses.

GEORGE WILSON HEATH.

Witnesses:
 STEPHEN EDWARD GUNYON,
 WILLIAM ANDERSON SMITH.